US012622428B2

(12) United States Patent　　　(10) Patent No.:　　US 12,622,428 B2

Gauker　　　　　　　　　　　　　　(45) Date of Patent:　　　May 12, 2026

(54) CAGE TRAP TRIP MECHANISM AND ASSEMBLY METHOD

(71) Applicant: Woodstream Corporation, Lancaster, PA (US)

(72) Inventor: Andrew Joseph Gauker, Mohnton, PA (US)

(73) Assignee: Woodstream Corporation, Lancaster, PA (US)

( * ) Notice: Subject to any disclaimer, the term of this patent is extended or adjusted under 35 U.S.C. 154(b) by 332 days.

(21) Appl. No.: 18/116,121

(22) Filed: Mar. 1, 2023

(65) Prior Publication Data

US 2024/0292828 A1　　　Sep. 5, 2024

(51) Int. Cl.
*A01M 23/24*　　　(2006.01)
*A01M 23/18*　　　(2006.01)

(52) U.S. Cl.
CPC ............. *A01M 23/24* (2013.01); *A01M 23/18* (2013.01)

(58) Field of Classification Search
CPC ...... A01M 23/02; A01M 23/04; A01M 23/08; A01M 23/18; A01M 23/24
See application file for complete search history.

(56) References Cited

U.S. PATENT DOCUMENTS

| | | | | |
|---|---|---|---|---|
| 3,834,063 | A * | 9/1974 | Souza ................... | A01M 23/16 43/61 |
| 5,845,432 | A * | 12/1998 | Tully ................... | A01M 23/20 43/61 |
| 5,862,624 | A * | 1/1999 | Askins ................. | A01M 23/20 43/60 |
| 7,370,451 | B2 * | 5/2008 | Rich ..................... | A01M 23/18 43/60 |
| 9,661,839 | B2 * | 5/2017 | Zhu ....................... | A01M 23/18 |
| 9,730,437 | B2 * | 8/2017 | Marks ................... | A01M 23/18 |
| 10,433,536 | B2 * | 10/2019 | Marks ................... | A01M 23/18 |
| 2017/0112119 | A1 * | 4/2017 | Novatney ............. | A01M 23/02 |

* cited by examiner

*Primary Examiner* — Marisa V Conlon
(74) *Attorney, Agent, or Firm* — Barley Snyder

(57)　　　　　　ABSTRACT

A live animal trap comprises a cage assembly defining an interior space accessible via at least one entrance, a door assembly and a trigger assembly. The cage assembly includes a floor, a pair of opposed side walls, a rear wall and a top wall removably connected to the pair of side walls and the rear wall. The door assembly includes a door pivotally mounted to the cage assembly and movable between a closed position and an open position for selectively opening and closing the at least one entrance. The trigger assembly includes a trigger arranged within the interior space of the cage assembly. A first linkage of the trap is removably attached to the door assembly in an operating position. The first linkage is adapted to engage with the trigger assembly to hold the door in the open position.

15 Claims, 11 Drawing Sheets

CAGE TRAP TRIP MECHANISM AND ASSEMBLY METHOD

FIELD OF THE INVENTION

The present disclosure relates to the field of animal control and, more particularly, to a live-catch animal trap and method of using the same.

BACKGROUND

Live or live-catch animal traps include traps adapted to trap an animal unharmed within an enclosure, such as a cage. Traps of this nature have experienced increasingly wide spread use due to their inherent humane characteristics. Live animal traps of the prior art generally consist of a box-like cage having at least one opening or passage therein. The opening is selectively closed by a door through the operation of a trip or triggering mechanism placed within the cage and upon which bait is placed. An animal lured through the opening of the cage by the bait will subsequently trigger the trip mechanism, which closes the door and serves to seal off the opening behind the animal, thus trapping the animal unharmed within the cage.

Current traps include cages constructed of wire or wire mesh. The use of wire mesh, however, creates technical challenges. For example, attaching trap components to the wire mesh cage is relatively difficult, costly and time consuming, as metal forming and/fastening techniques that require specialized tooling and fixtures are typically needed. Moreover, existing trigger mechanisms are unnecessarily difficult to manufacture and package for shipping. In particular, known trigger mechanisms include components (e.g., linkages) that are arranged in an exposed manner and external to the cage. As a result, these elements are prone to damage during shipping and/or storage.

Improved live animal traps addressing these and other drawbacks of current designs are desired.

SUMMARY

A live animal trap according to an embodiment of the present disclosure comprises a cage assembly, a door assembly and a trigger assembly. The cage assembly defines an interior space accessible via at least one entrance, and includes a floor, a pair of opposed side walls, a rear wall and a top wall removably connected to the pair of side walls and the rear wall. The door assembly includes a door pivotally mounted to the cage assembly and movable between a closed position and an open position for selectively opening and closing the at least one entrance. The trigger assembly includes a trigger plate arranged within the interior space of the cage assembly. A first linkage of the trap is removably attached to the door assembly in an operating position. The first linkage is adapted to engage with the trigger assembly to maintain the door in the open position.

BRIEF DESCRIPTION OF THE DRAWINGS

The invention will now be described by way of example with reference to the accompanying Figures, of which.

DETAILED DESCRIPTION OF THE EMBODIMENTS

Figure 1:
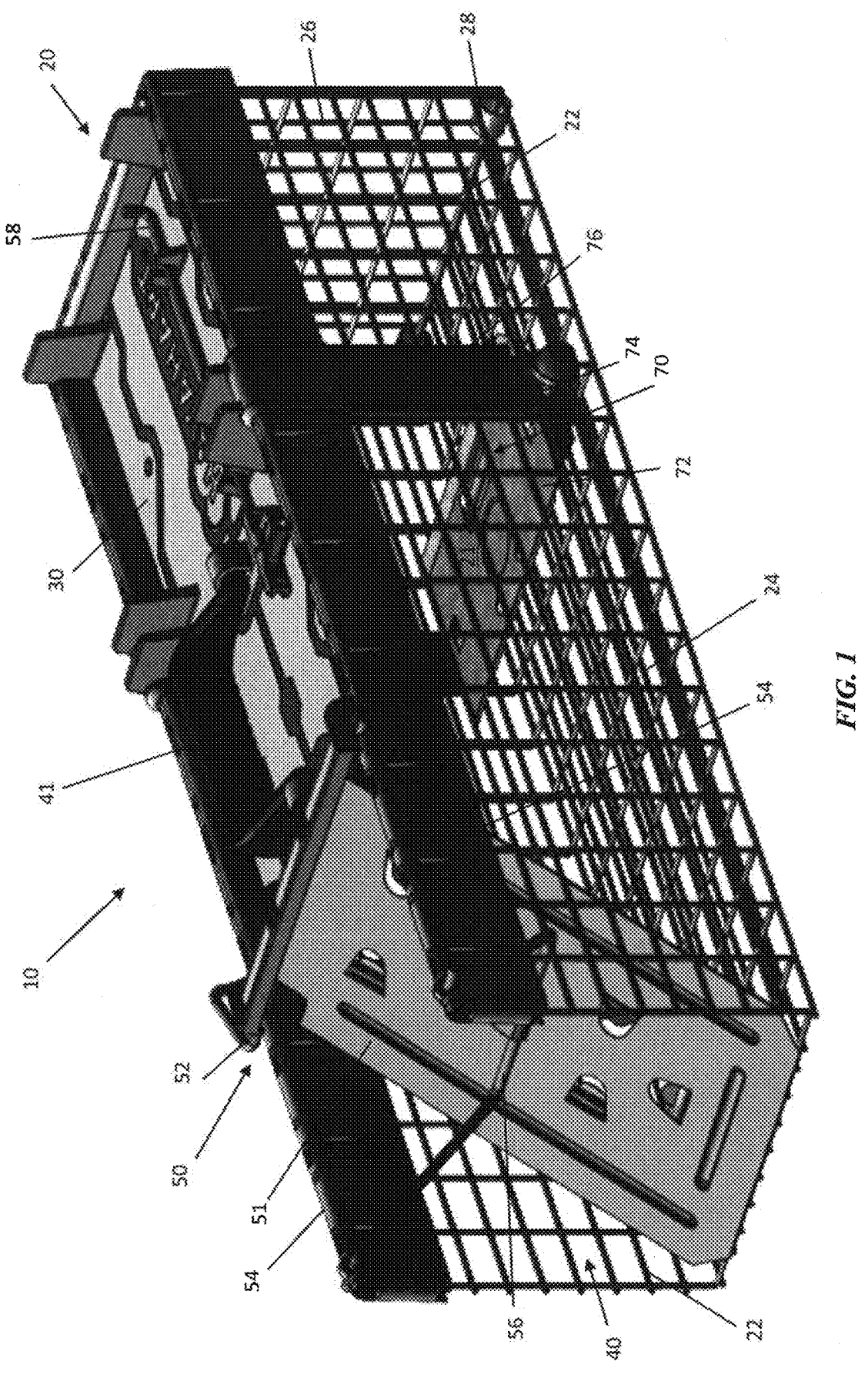
FIG. 1 is a first side perspective view of an animal trap according to an embodiment of the present disclosure in a storage or shipping state.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure include a live catch animal trap have an improved trip or trigger mechanism which reduces potential damage to the trap during shipping and storage, as well as a cage construction which promotes ease of assembly, safety and reduced costs compared to prior art designs. In one embodiment, the trap comprises a cage assembly defining at least one entrance. The cage may include a floor, a pair of opposed side walls, a rear wall and a top wall. The floor, side walls and rear wall may be constructed of a wire mesh. The top wall may be formed as a unitary polymer component that is removably connectable to the side and rear walls in a snap-fit or latching manner. The trap further includes a door assembly and a trip or trigger assembly. The door assembly comprises a door pivotally mounted to the cage assembly. The door is adapted with the trigger assembly to selectively hold the door open for permitting an animal to access an interior of the cage assembly, and to close the door and retain the animal within the interior when tripped or triggered. The trigger assembly comprises a trigger (e.g., a trigger plate) arranged within the interior of the cage assembly, and an intermediate linkage operatively connecting the trigger assembly to the door assembly. The intermediate linkage is removably attachable to the door assembly in a first or operating position. In a second or storage position, the intermediate linkage is detached from the door assembly, and removably attached to another portion of the cage assembly, such as within a recessed pocket defined by the top wall.

With reference to FIGS. 1-5, a general description of an animal trap 10 according to an embodiment of the present disclosure is provided. As shown, the trap 10 includes a box-shaped cage or cage assembly 20, a door mechanism or assembly 50 and a trip or trigger mechanism or assembly 70. The cage assembly 20 defines an interior space 21 and includes opposed parallel lateral sides or side walls 22, a bottom portion or wall 24, a rear or end portion or wall 26 and a top wall or cover 30. An open end or entrance 40 of the cage 20 is defined at a front end thereof, opposite the rear or end wall 26.

In the exemplary embodiment, each of the lateral side walls 22, the bottom wall 24 and the end wall 26 are formed from wire, and more specifically have a wire-mesh construction including a plurality of interconnected wires. In one particularly advantageous embodiment, the side walls 22 and bottom wall 24 are formed as a continuous, unitary piece that is folded into the U-shaped form shown. The end wall 26 may then be attached to the bottom wall 24 and/or side walls 22 via rings or clasps 28. As will be set forth in greater detail herein, with the bottom wall 24, side walls 22 and end wall 26 formed and connected as shown, the top wall 30 may be fitted over free ends thereof. Specifically, the top wall 30 may comprise a monolithic element, such a molded polymer component, that is snap-fit or latched to each of the side and end walls 22,26.

Figure 4:
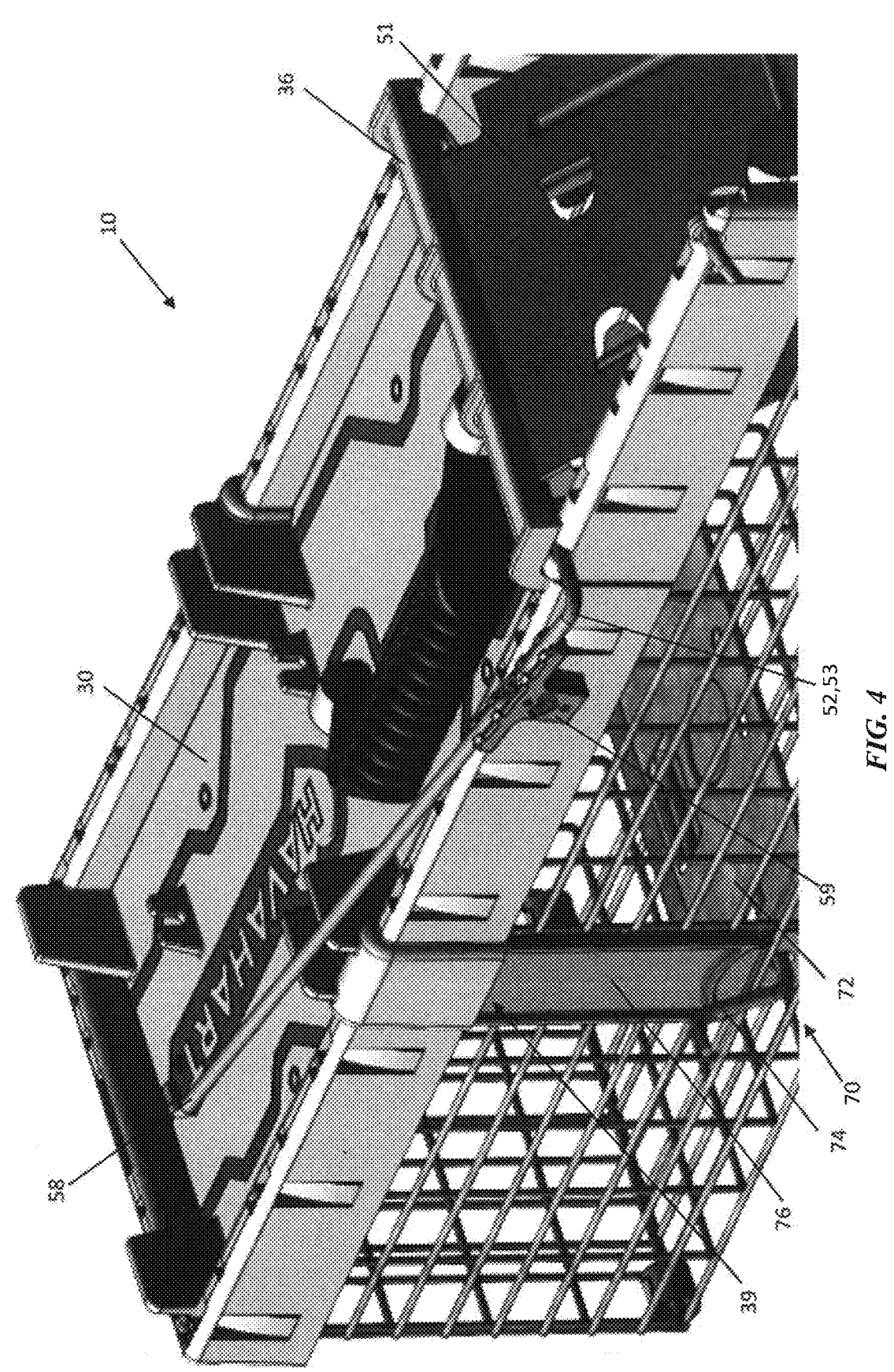
FIG. 4 is a partial side perspective view of the animal trap of the preceding figures in an operational state with the door in a closed position.
Figure 5:
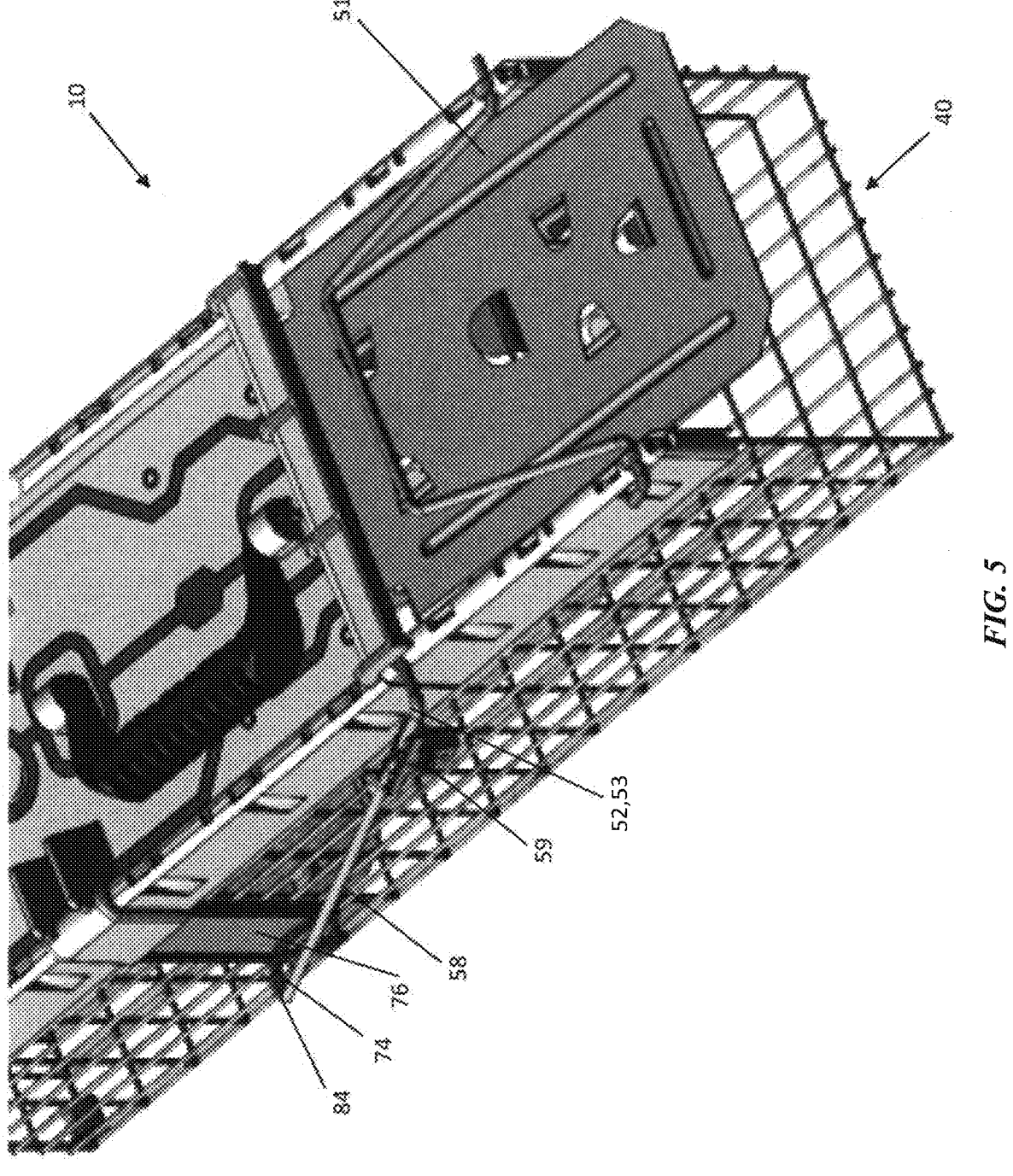
FIG. 5 is a partial top perspective view of the animal trap of the preceding figures in the operational state with the door in an open or armed position.

The door assembly 50 is fitted to a front of the cage assembly 20 for selectively closing the entrance 40 in response to the operation of the trigger assembly 70. The door assembly 50 includes a door 51, a door linkage or rod 52, a pair of side supports 54 and a locking arm 56. Each side support 54 may be attached (e.g., latched) over a top edge or portion of each side wall 22 proximate the trap entrance 40. The door linkage 52 is fixedly mounted to the door 51, and is pivotally or rotatably supported by the side supports 54 such that the door may be pivoted between a closed position, as shown in FIGS. 1-4, and an open or set position shown in FIG. 5. The locking arm 56 is likewise pivotally or rotatably supported by the side supports 54 and is movable between an unlocked position as shown in FIG. 5, and a locked position as shown in FIGS. 1-4. The side supports 54 may be molded polymer components aiding in the easy at which the remainder of the door assembly 50 may be mounted to the cage assembly 20.

Figure 2:
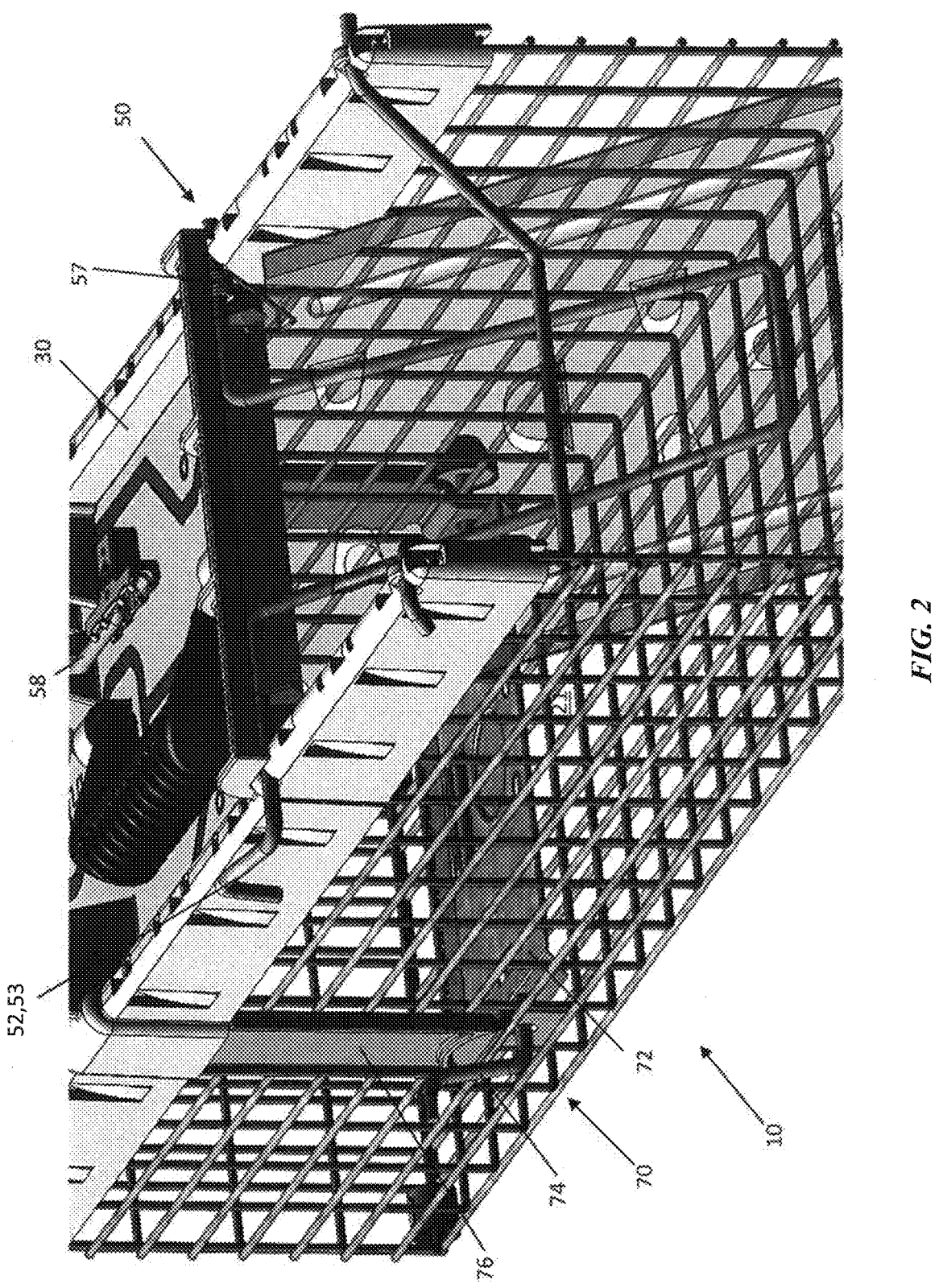
FIG. 2 is partial side perspective view of the animal trap of FIG. 1 in the storage or shipping state, with a door thereof shown in shadow.
Figure 3:
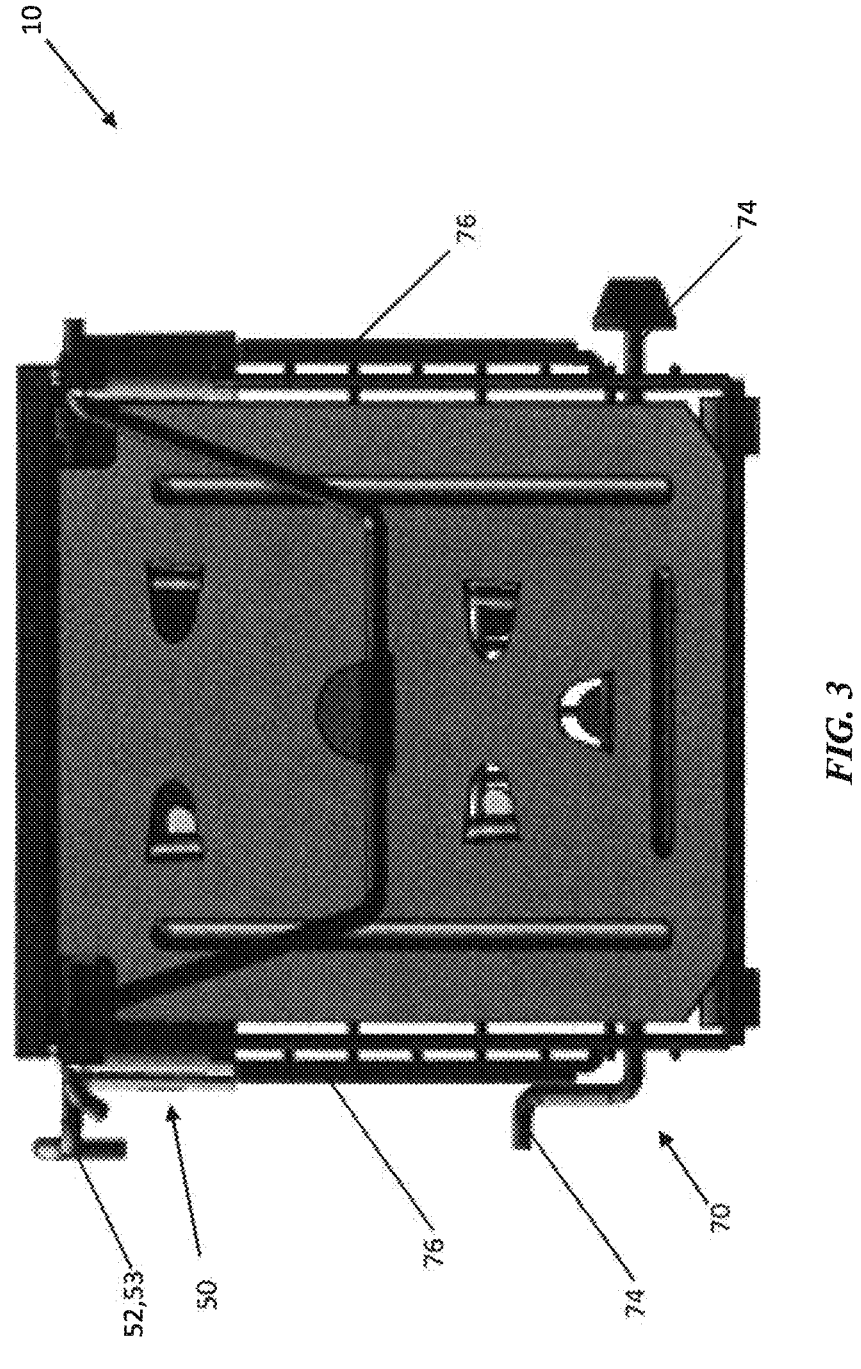
FIG. 3 is a front view of the animal trap of the preceding figures in the storage or shipping state.

Referring to FIGS. 1 and 2, an intermediate linkage or rod 58 of the trap 10 is shown in a storage or shipping position, wherein it is removably attached to the top wall 30. The intermediate linkage 58 is selective connectable to the door linkage 52 via a connector 59 in a usage or operating position, as shown in FIGS. 4 and 5. For the purposes of this description, the intermediate linkage 58 may be referred to as a standalone component, or as a part of the trigger assembly 70 and/or the door assembly 50.

With the intermediate linkage 58 connected to the door linkage 52, the door assembly 50 is connectable to, or engageable with, the trigger assembly 70 for setting (i.e., holding open) and releasing (i.e., closing) the door 51. The trip or trigger assembly 70 includes a trigger or trigger plate 72, a trigger linkage or rod 74 and a pair of trigger supports 76. The trigger plate 72 is arranged within the interior 21 of the cage assembly 20 and is fixedly mounted to the trigger linkage 74. The trigger linkage 74 is rotatably supported by the trigger supports 76, enabling the trigger plate 72 to rotate or pivot about an axis defined by the trigger supports.

The trigger linkage 74 is adapted to engage with and hold a movable free end of the intermediate linkage 58 in a set or ready position of the trap. The set position is associated with the door 51 being in the open position, as shown in FIG. 5. Once set, rotation of the trigger plate 72 and thus trigger linkage 74 in either direction is operative to release the intermediate linkage 58 from the set position, freeing the door 51 to move to the closed position, as shown in FIG. 5. The door may move under the force of gravity and/or with the aid of an elastic element, such as a torsion spring 57, as shown in FIG. 2. Specifically, the spring 57 includes a first end arranged on the door 51, and a second end engaged with the cage assembly 20 (e.g., the side wall 22) and is adapted to bias the door into the closed position.

Figure 6:
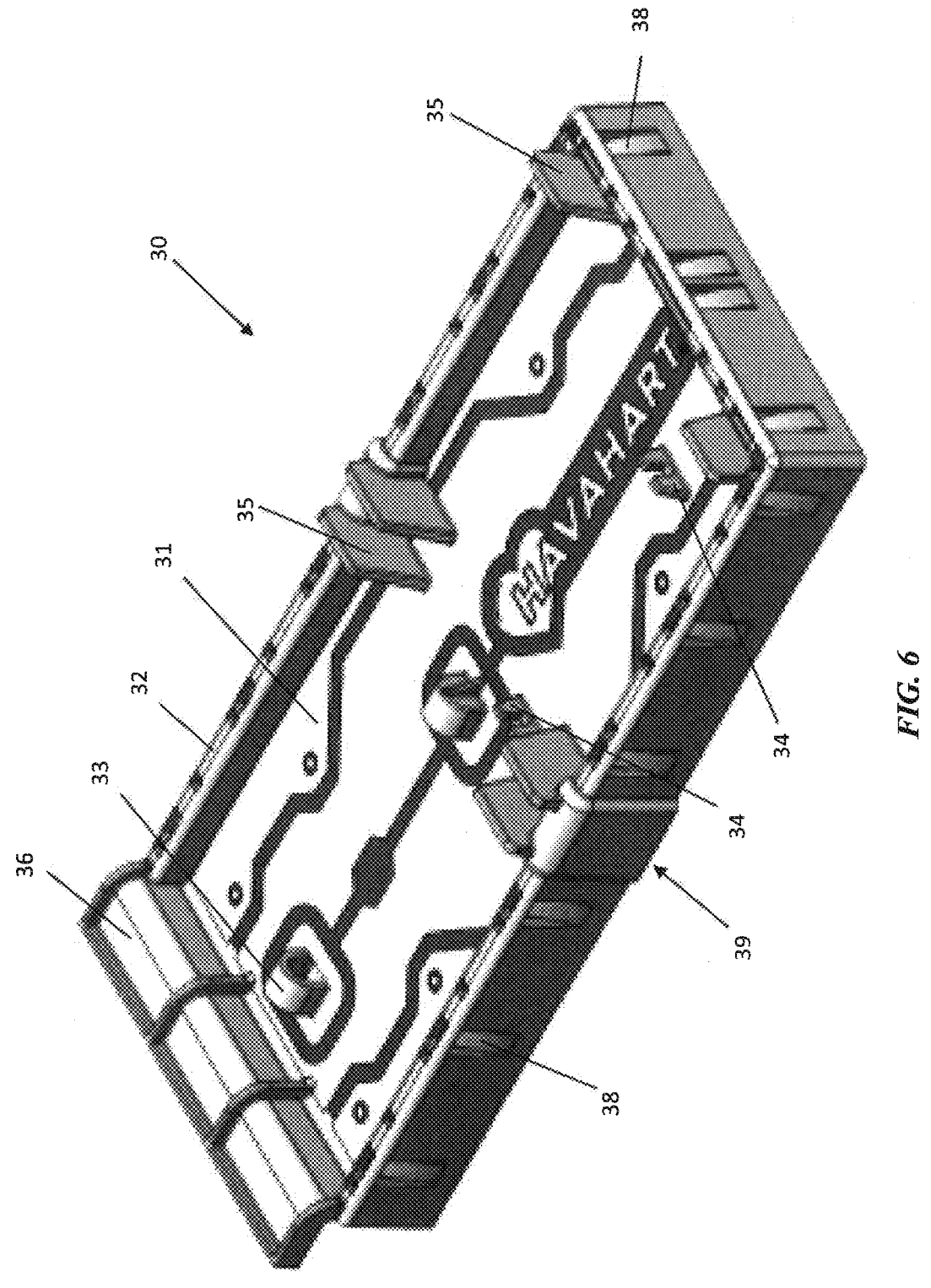
FIG. 6 is a top perspective view of a top wall of the animal trap of the preceding figures.
Figure 7:
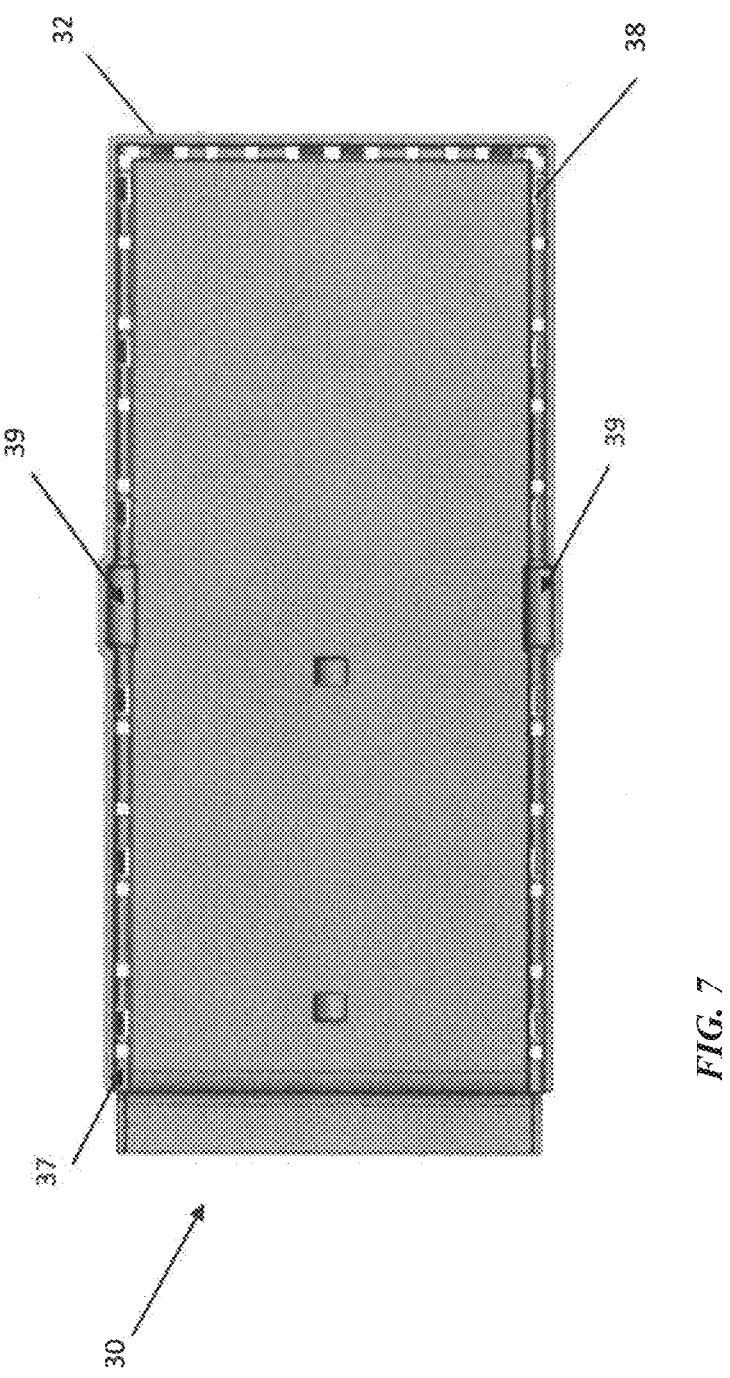
FIG. 7 is a bottom view of the top wall of FIG. 6.
Figure 8:
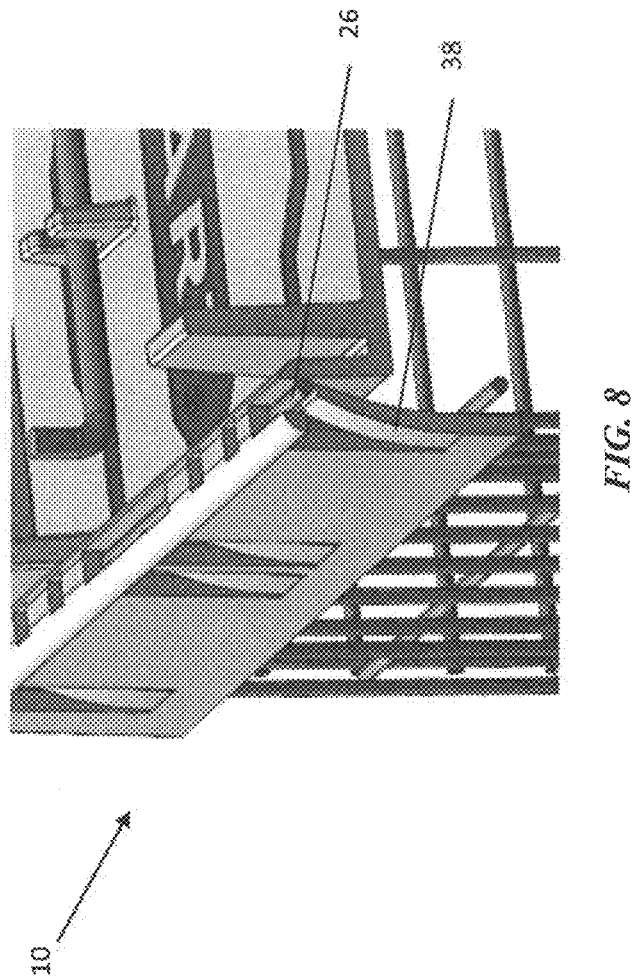
FIG. 8 is a partial front cross-sectional view of the top wall of FIGS. 6 and 7.

With reference to FIGS. 6-8, the exemplary top wall or cover 30 of the trap 10 includes a recessed platform 31 and a raised perimeter wall 32 extending vertically therefrom. The platform 31 defines integral handle mounts 33 for rotatably supporting a handle 41, integral linkage mounts 34, integral standoff elements 35 and an integral door cover 36. The linkage mounts 34 comprise elastic clips adapted (e.g., sized and located) to removably hold the intermediate linkage 58 and the connector 59 in the storage or shipping position, as shown in FIGS. 1 and 2. The linkage 58 is held in a generally longitudinal orientation relative to a remainder of the trap 10, and generally parallel to a direction of extension of the side walls 22. The recessed nature of the platform 31 ensures that the linkage 58, the connector 59 and the handle 41 remain below a plane defined by a top of the standoff elements 35 and the door cover 36, or in other embodiments the perimeter wall 32. In this way, damage to the linkage 58 during shipping or storage is prevented, and stable, even vertical stacking of a plurality of the traps 10 is enabled.

As shown in the bottom view of FIG. 7, the perimeter wall 32 defines a channel 37 formed in an underside thereof and extending about at least three sides of the wall. The channel 37 is adapted to receive corresponding wires forming the side and end walls 22,26 therein in an installed position of the top wall 30. As shown in FIG. 8, a plurality of elastic latching arms or latches 38 are defined by the top wall 30 and include free ends extending into the channel 37. The latches 38 are adapted to be biased outwardly as the top wall 30 is installed over the wires of the side and end walls 22,26. The latches 38 elastically return to a latched position, as shown in FIG. 8 once the wire is fully seated within the channel 37. In this way, the top wall 30 forms a snap-fit lid or cover of the cage assembly 20. The latches 38 are spaced about a perimeter of the channel 37 to provide distributed and symmetrical attachment to the cage assembly 20.

As shown most clearly in FIG. 7, the top wall 30 further defines a pair of recesses 39 formed in communication with the channel 37. The recesses 39 are adapted to receive a top portion of each of the trigger supports 76 with the top wall 30 in the installed position. This arrangement ensures that the trigger supports 76 stay accurately positioned relative to one another, and to a remainder of the trap. In turn, this ensures proper operation of the trigger assembly 70.

Figures 9, 10:
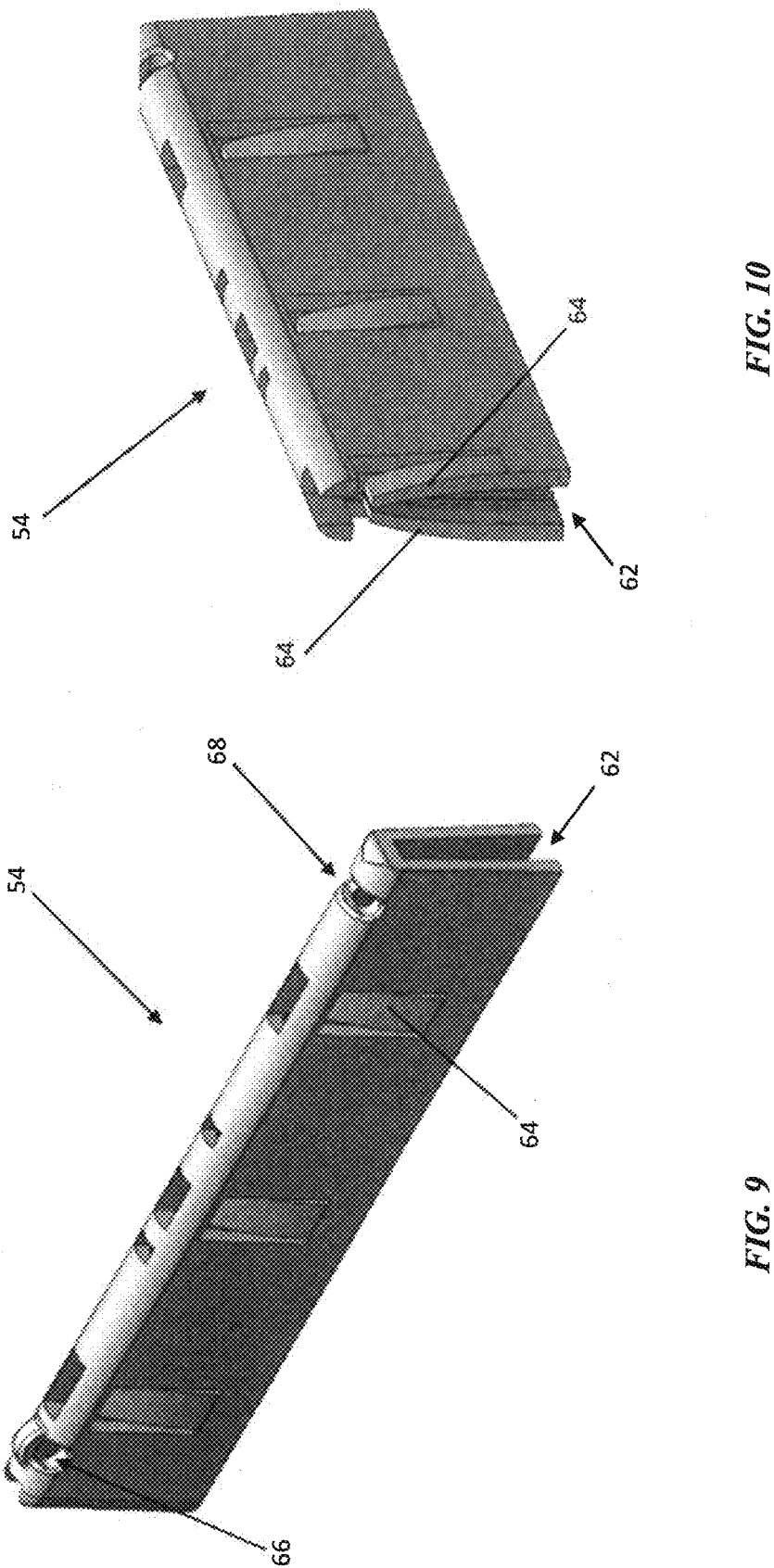
FIG. 9 is a side perspective view of a door side support of the animal trap according to an embodiment of the present disclosure.
FIG. 10 is a partial cross-sectional perspective view of the door side support of FIG. 9.

Referring now to FIGS. 9 and 10, the side supports 54 of the door assembly 50 may take on a construction similar to that of the perimeter wall 32 of the top wall 30. Specifically, each molded side support 54 defines a channel 62 sized to receive a wire of a respective side wall 22. Like the top wall 30, each side support 54 may be snap-fitted onto each side wall 22 via elastic latches 64 which selectively capture a longitudinally extending edge wire of the side wall within the channel 62. In the exemplary embodiment, the latches 64 are formed in opposing pairs, as distinct from the single latch arrangement of the top wall 30. However, it should be understood that either component may be formed with either latch arrangement without departing from the scope of the present disclosure.

Each side support 54 further defines a through hole or opening 66 adapted to receive a free end of the U-shaped locking arm or door latch 56 for securing the door 51 in the closed position after the trap 10 has been triggered, as shown in FIGS. 1 and 2, by way of example. Each side support 54 further includes a second opening or slot 68 adapted to rotatably support the door linkage 52 therein. As shown in FIG. 4, in the installed position of the top wall 30, the door cover 36 thereof acts to secure the door linkage 52 within the slots 68 of each side support 54.

Figures 11, 12:
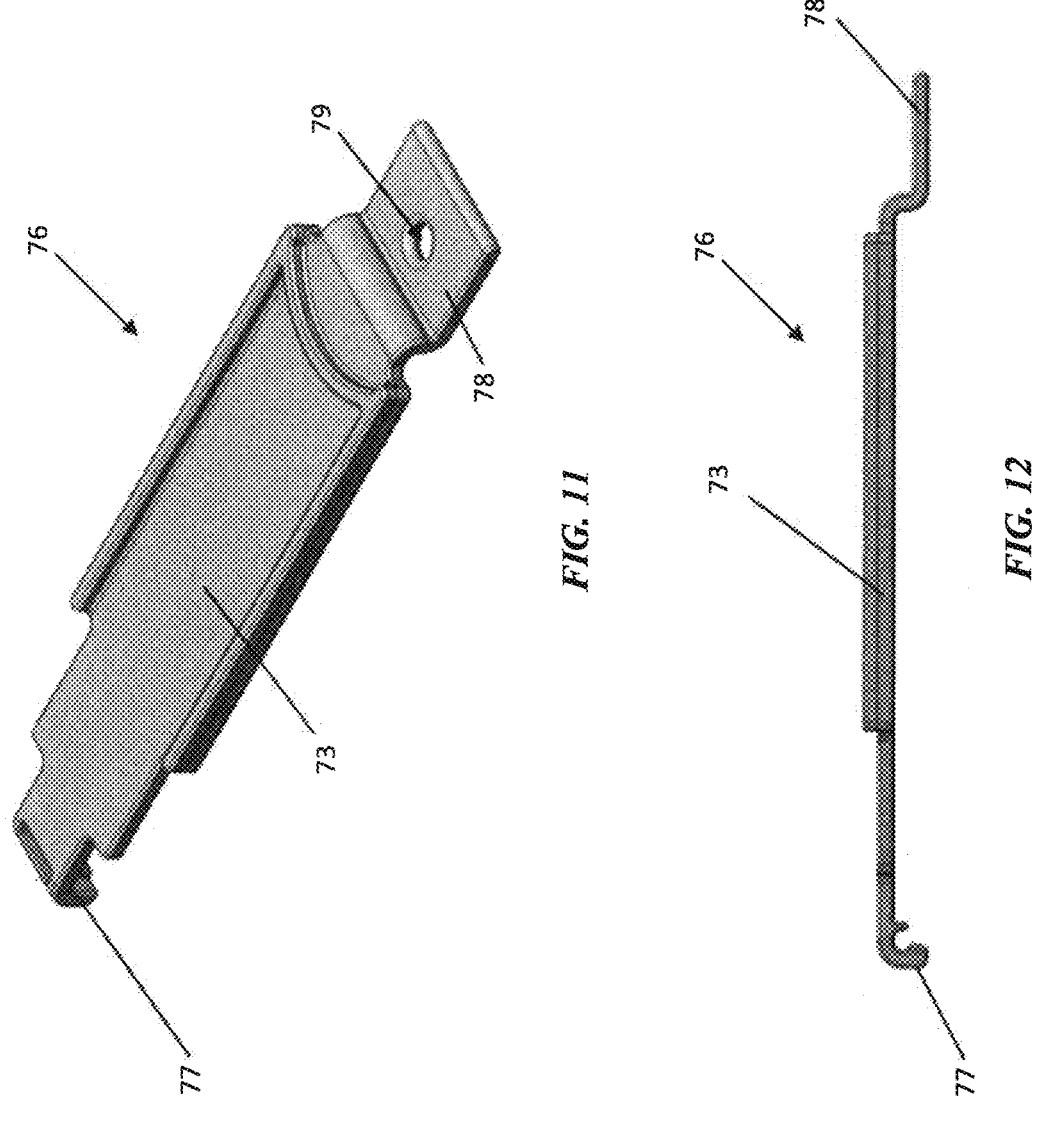
FIG. 11 is a perspective view of a trigger support of the animal trap of the preceding figures.
FIG. 12 is a side view of the trigger support of FIG. 11.

Referring generally to FIGS. 11 and 12, each trigger support or bracket 76 comprises a monolithic, molded polymer component. The trigger supports 76 each define a hook-shaped first end 77 for latching to a wire of a respective side wall 22, and a second end 78 defining a through hole 79 for pivotally or rotatably supporting the trigger linkage 74. As best seen in FIG. 12, the second end 78 of each trigger support 76 is offset from an intermediate portion 73 thereof. This offset simplifies the attachment of the trigger supports 76 to the cage assembly 20. Specifically, with each trigger support 76 in an installed position including the first end 77 engaged with a wire of the cage assembly 20, the second end 78 is adapted to be arranged within the interior 21 of the trap and held against an interior side of side wall 22, while the intermediate portion 73 is arranged on an exterior of the side wall. See FIG. 2, for example. This arrangement acts to firmly secure the second end 78 of the trigger support 76 in position without the need for additional fastening provisions or elements. This arrangement simplifies both the manufacture and assembly of the trap 10.

Figures 13, 14, 15:
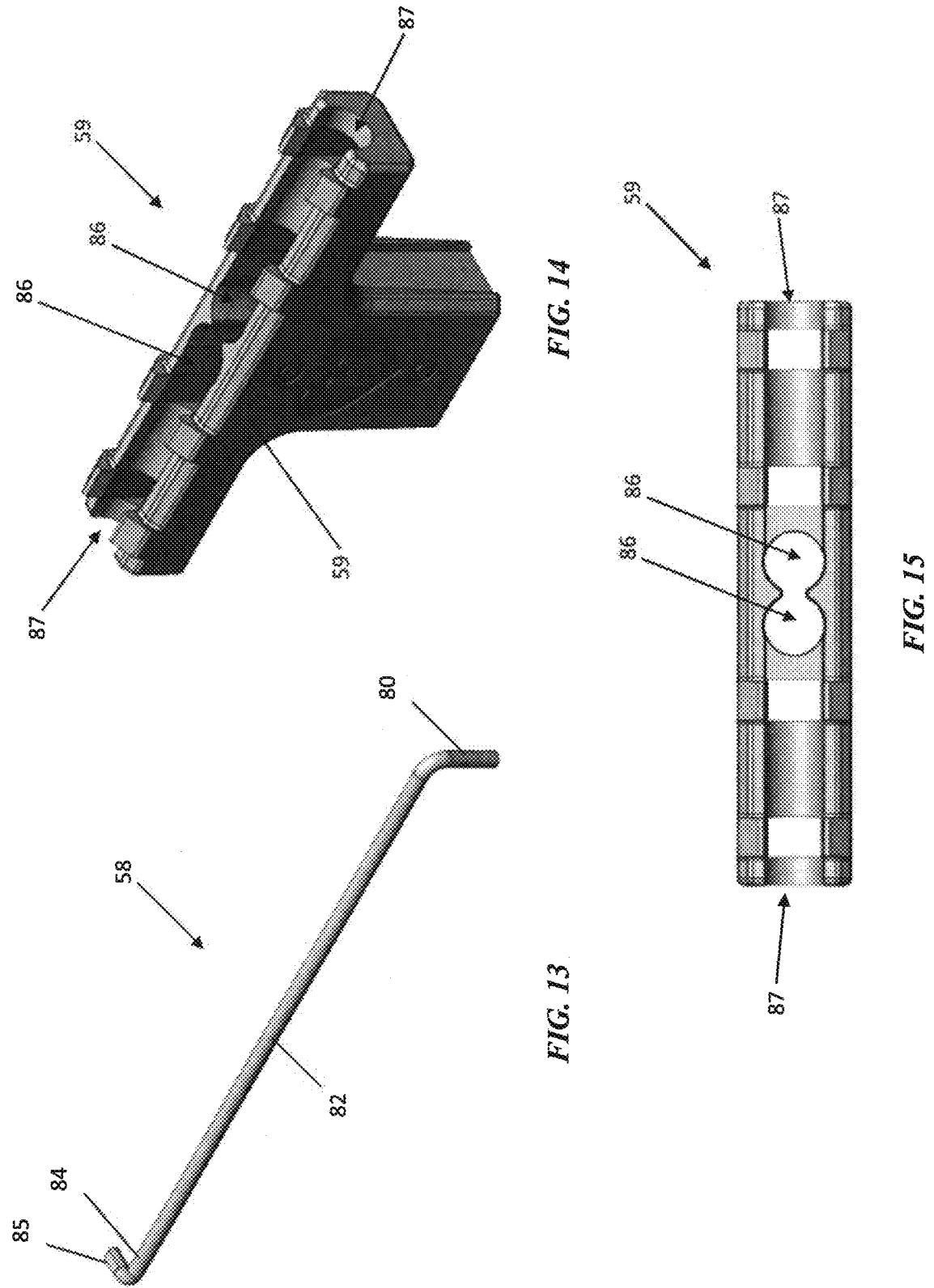
FIG. 13 is a side perspective view of an intermediate trigger linkage of the animal trap of the preceding embodiment.
FIG. 14 is a perspective view of a linkage connector of the animal trap of the preceding embodiment.
FIG. 15 is a top view of the linkage connector of FIG. 14.

FIG. 13 provides a detailed view of the intermediate linkage 58. As shown, the linkage 58 defines a first, L-shaped or free end 80 bent at an approximately ninety-degree angle with respect to an elongated intermediate section 82 thereof. Similarly, a second end 84 of the linkage 58 is also L-shaped, or bent at another approximately ninety-degree angle and offset from the bend in the first end 80 in a radial direction. The second end 82 may be further formed with oppositely facing, flat bearing surfaces 85 for engaging with a free end of the trigger linkage 74. The end of the trigger linkage may also define a flat surface for abutting the bearing surface(s) 85. It should be understood that the intermediate linkage 58, the trigger linkage 74 and the door linkage 52 may each be formed from, for example, a metal rod bent into the illustrated shape.

As shown in FIGS. 14 and 15, the connector 59 is adapted to receive the first end 80 of the linkage 58 through one of a pair of vertically oriented openings 86, and latch to, or form a friction fit with, a portion of the intermediate section 82 arranged within a first one of a pair of receiving slots 87. As shown in FIGS. 2, 4 and 5, the door linkage 52 likewise defines an L-shaped end 53 which is received in a second side of the connector 59. As can be visualized from the figures, the connector 59 is adapted to removably connected the linkages 52,58 such that relative motion therebetween is fixed in all directions. In the exemplary embodiment, the connector 59 is a monolithic, molded polymer component.

Referring again to FIG. 5 the operation of the trap 10 will be described. With the door 51 in the open position, the assembled linkages 52,58 are oriented such that the second end 84 of the intermediate linkage 58 is arranged adjacent an offset end of the trigger linkage 74. By positioning the end of the trigger linkage 74 over the second end 84 of the intermediate linkage 58 (corresponding to a generally level orientation of the trigger plate 62), the assembled linkages 52,58 are prevented from rising in a generally vertical direction. In this way, the door 51 is held in the open or set position by the trigger linkage 74.

Depression of the trigger plate 62, such as that caused by an animal pressing on either side thereof, rotates the plate and thus the trigger linkage 74. As the free end of the trigger linkage 74 is radially offset from its rotational axis, its rotation will also cause its displacement in either longitudinal direction (i.e., toward the front or the rear of the trap). This motion will disengage the second end 84 of the intermediate linkage 58 and the trigger linkage 74, and permit the assembled linkages 52,58 to be moved on their upward arc, urged by at least one of the force of gravity due to the weight of the door 51 on a U-shaped section of the door linkage 52, and/or via the elastic return force of the spring 57. This motion closes the door 51, as shown in FIGS. 1-4.

The above-described embodiments of the present disclosure provide several advantages over the prior art. For example, in prior art traps, no removable intermediate linkage is provided. Rather, the door linkage is elongated and engages directly with the trigger linkage. As this linkage is arranged largely on an exterior of the cage assembly, it is easily subject to damage during shipping and/or storage, which in turn may damage the trigger and/or door assemblies. By providing a detachable intermediate linkage element, such drawbacks are largely eliminated without affecting trap functionality. Moreover, forming the top wall, the trigger supports, and the side supports as molded, snap-fit components simplifies manufacturing and assembly of the trap 10, and reduces the required metal forming operations and associated tooling to a minimum.

As a result of this construction, a user can assemble all or some of the cage and door assemblies after purchase. For example, the top wall or cover and the door assembly may be delivered to an end user in an unassembled state, and assembled by the user without the need to perform any metal-forming operations. It should be understood that the ease at which the trap according to the above-described embodiments may be assembled is equally beneficial to non-end user assemblers.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An animal trap, comprising:
a cage assembly defining an interior space accessible via at least one entrance, including:
a floor;
a pair of opposed side walls;
a rear wall; and
a top wall removably connected to the pair of side walls and the rear wall, the top wall includes a recessed platform and a raised perimeter wall, the recessed platform defining clips;
a door assembly including a door pivotally mounted to the cage assembly and movable between a closed position and an open position for selectively opening and closing the at least one entrance;
a trigger assembly including a trigger arranged within the interior space of the cage assembly; and
a first linkage removably attached to the door assembly in an operating position, and adapted to engage with the trigger assembly to hold the door in the open position, wherein:
the trap is reconfigured between an operative configuration and a storage configuration, in the operative configuration, the first linkage is held by and is operatively connected to a trigger linkage and a rod,
in the storage configuration, the first linkage is removed from the trigger linkage and the rod and is removably held in place by the clips,
a recessed nature of the recessed platform ensures that the first linkage remains below the top surface of the perimeter wall while the trap is in the storage configuration.

2. The animal trap of claim 1, wherein the trigger includes a trigger plate pivotally mounted to the cage assembly via at least one mounting bracket, the at least one mounting bracket removably attached to at least one of the floor, the top wall or one of the pair of opposed side walls.

3. The animal trap of claim 2, wherein the trigger plate is fixedly mounted to the trigger linkage, the trigger linkage rotatably connected to at least one of the pair of side walls via the at least one mounting bracket and having a free end engaging with a free end of the first linkage with the first linkage in the operating position and the door in the open position.

4. The animal trap of claim 2, wherein the top wall is fitted over and receives a portion of the at least one mounting bracket.

5. The animal trap of claim 2, wherein a first portion of the at least one mounting bracket is arranged on an exterior of the cage assembly and a second portion of the at least one mounting bracket is arranged in the interior space of the cage assembly.

6. The animal trap of claim 1, wherein the top wall is snap fit to the pair of side walls and the rear wall via a plurality of elastic latches.

7. The animal trap of claim 1, wherein in the operating position, the first linkage is arranged outside of the interior space of the trap and exterior to one of the pair of opposed side walls.

8. The animal trap of claim 1, wherein the floor and the pair of opposed side walls are formed from a wire mesh, and the top wall is a monolithic, polymer wall.

9. The animal trap of claim 1, wherein the door is fixedly attached to a second linkage, the second linkage rotatable relative to the cage assembly for moving the door between the open and closed positions.

10. The animal trap of claim 9, further comprising a connector adapted to rigidly and removably connect the first linkage to the second linkage in the operating position.

11. The animal trap of claim 10, wherein the connector includes a first opening receiving a free end of the first linkage and a second opening receiving a free end of the second linkage.

12. An animal trap, comprising:
a cage defining an interior space and including:
a wire mesh floor, a pair of wire mesh side walls, a wire mesh rear wall; and
a polymer top wall removably attached to at least one of the rear wall or the side walls, the polymer top wall includes a recessed platform and a raised perimeter wall, the recessed platform defining clips;
an intermediate linkage;
a trigger linkage;
a door mounted to the cage and adapted to selectively open and close an entrance of the trap to the interior space; and
a trigger assembly operatively connectable to the door and adapted to hold the door in an open position, wherein:
the trap includes an ability to switch between an operative configuration and a storage configuration,
in the operative configuration, the intermediate linkage is held by and is operatively connected to the trigger linkage and a linkage rod,
in the storage configuration, the intermediate linkage is removed from the trigger linkage and linkage rod and is removably held in place by the clips, and
a recessed nature of the recessed platform ensures that the intermediate linkage remains below the top surface of the perimeter wall while the trap is in the storage configuration.

13. The animal trap of claim 12, further comprising a pair of polymer side supports attached to a respective one of the pair of wire mesh side walls and rotatably supporting the door.

14. The animal trap of claim 13, wherein top wall and the side supports are each molded, monolithic elements.

15. The animal trap of claim 13, wherein the top wall and the side supports are snap fit to the side walls via a plurality of elastic latches.

* * * * *